United States Patent
Werner et al.

[19]

[11] Patent Number: 5,944,320
[45] Date of Patent: Aug. 31, 1999

[54] BRUSH SEAL HAVING BRISTLES TILTED IN THE CIRCUMFERENTIAL DIRECTION

[75] Inventors: Klemens Werner, Munich; Alfons Gail, Friedberg; Stefan Beichl, Herrsching, all of Germany

[73] Assignee: MTU Motoren- und Turbinen-Union Muenchen GmbH, Munich, Germany

[21] Appl. No.: 09/045,162

[22] Filed: Mar. 19, 1998

[30] Foreign Application Priority Data

Mar. 22, 1997 [DE] Germany ............... 197 12 088

[51] Int. Cl.⁶ .......................................... F16J 15/447
[52] U.S. Cl. .......................................... 277/355
[58] Field of Search ................................. 277/355

[56] References Cited

U.S. PATENT DOCUMENTS

| | | | |
|---|---|---|---|
| 4,358,120 | 11/1982 | Moore | 277/355 |
| 4,971,336 | 11/1990 | Ferguson | 277/355 |
| 5,029,875 | 7/1991 | Spain et al. | 277/355 |
| 5,066,025 | 11/1991 | Hanrahan | 277/355 |
| 5,181,728 | 1/1993 | Stec | 277/355 |
| 5,183,197 | 2/1993 | Howe | 277/355 |
| 5,316,318 | 5/1994 | Veau | 277/355 |
| 5,474,306 | 12/1995 | Bagepalli et al. | 277/355 |
| 5,480,165 | 1/1996 | Flower | 277/355 |
| 5,522,698 | 6/1996 | Butler et al. | 277/355 |

FOREIGN PATENT DOCUMENTS

| | | |
|---|---|---|
| 0214192 | 6/1989 | European Pat. Off. . |
| 3514382 | 6/1986 | Germany . |
| 3720069 | 12/1987 | Germany . |
| 3828833 | 3/1990 | Germany . |
| 3907614 | 9/1990 | Germany . |
| 3828363 | 2/1992 | Germany . |
| 19527781 | 9/1996 | Germany . |
| 19618475 | 11/1997 | Germany . |
| 19641375 | 12/1997 | Germany . |
| 3-125081 | 5/1991 | Japan . |
| 3-209068 | 9/1991 | Japan . |
| 1541001 | 2/1979 | United Kingdom . |

*Primary Examiner*—Anthony Knight
*Assistant Examiner*—John L. Beres
*Attorney, Agent, or Firm*—W. F. Fasse; W. G. Fasse

[57] ABSTRACT

A brush seal (1, 101) seals a circumferential gap ($S_1$) between two relatively rotatable machine components (2, 102; 3, 103), such as the rotor or a shaft and a stator of a fluid flow machine, such as a gas turbine engine. A plurality of seal bristles (4, 104) are fixed in a bristle holder (5) in an annular shape, and are mounted on the stator (3, 103) so that the free bristle ends (7, 107) extend toward and provide a seal against a seal surface (9, 109) of the rotor (2, 102). Each bristle includes a middle body portion (4A) that is tilted at a first tilt angle ($\alpha_1$) in the circumferential direction following the rotation direction, and the free bristle end (7, 107) is bent or angled relative to the tilted body portion (4A) so as to extend at a second tilt angle ($\alpha_2$) which is smaller than the first tilt angle ($\alpha_1$). Preferably, the first tilt angle ($\alpha_1$) is in the range from 30° to 60°, while the second tilt angle ($\alpha_2$) is in the range from 0° to 15°. The bristles may further be tilted in an axial direction at an angle ($\beta$) relative to a radially extending plane. Since the free bristle ends (7, 107) extend substantially perpendicularly to the seal surface (9, 109), the seal effectiveness and the elastic resiliency of the brush seal are maintained, and the bristles are not damaged, independent of the rotation direction of the rotor.

28 Claims, 3 Drawing Sheets

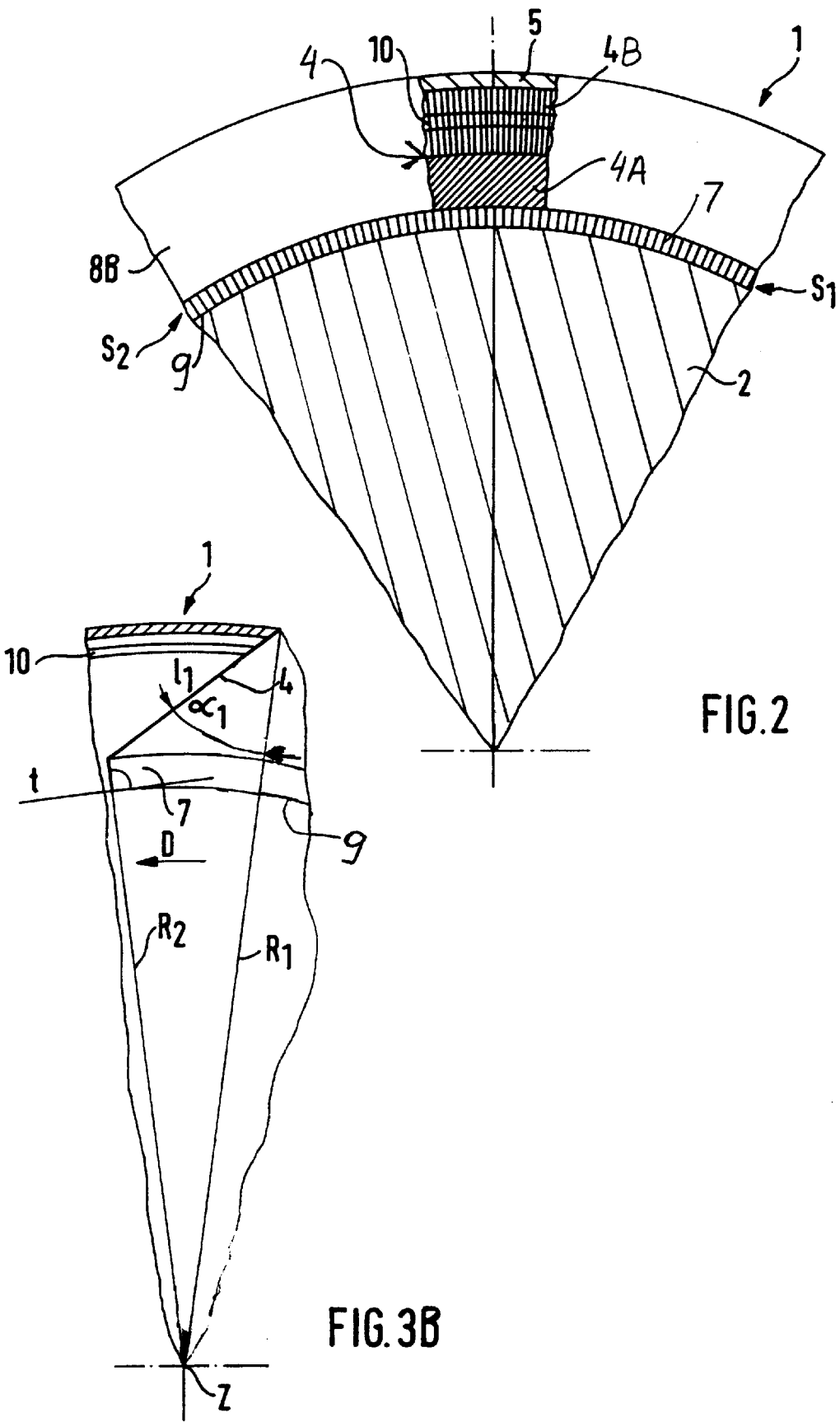

BRUSH SEAL HAVING BRISTLES TILTED IN THE CIRCUMFERENTIAL DIRECTION

PRIORITY CLAIM

This application is based on and claims the priority under 35 U.S.C. §119 of German Patent Application 197 12 088.1, filed on Mar. 22, 1997.

FIELD OF THE INVENTION

The invention relates to a brush seal for sealing a circumferential gap between two machine components that are relatively rotatable with respect to each other, having a plurality of bristles that are mounted in a ring shape on a first machine component and that have bristle ends directed at a sealing surface of the second machine component, whereby at least sections of the bristles are tilted at an angle $\alpha_1$ in the circumferential direction in the annular plane of the bristles.

BACKGROUND INFORMATION

Brush seals of the above mentioned general type are often used in fluid flow machines, and especially gas turbine engines, to provide a seal with the minimum possible leakage at circumferential gaps, for example between a machine housing and the rotor or around a rotary shaft of the turbine machine, between two spaces having different prevailing fluid pressures within the turbine machine. Generally, the bristles of the brush seal are held and guided so as to be elastically yieldable or movable in order to compensate for any eccentric or oscillating motions of the rotor or shaft relative to the housing, which may result, for example, from rotor imbalances or the like. In this context, brush seals have been recognized as advantageous over the previously long utilized labyrinth seals, because such labyrinth seals can only adapt themselves to eccentric shaft movements to a very limited degree. Namely, in that context, any forseeable eccentricities are to be taken into account by making corresponding provisions in the gap width. Furthermore, brush seals advantageously distinguish themselves over prior labyrinth seals by a lower production cost and a lower weight.

European Patent 0,214,192 discloses brush seal arrangements of the above mentioned general type, in which the seal bristles may be tilted at an angle $\alpha$ in the direction of rotation of the rotor or shaft relative to a radial direction, and in which the seal bristles may be adjustably tiltable at an angle $\beta$ in an axial direction relative to a plane perpendicular to the axis of the rotor or shaft.

U.S. Pat. No. 5,029,875 (Spain et al.) and U.S. Pat. No. 5,474,306 (Bagepalli et al.) disclose various brush seal arrangements in which the bristles may be tilted in a circumferential direction or in an axial direction relative to the annular plane of the bristles. In order to improve the seal effectiveness, Bagepalli et al. suggest to guide the seal bristles between two spaced apart ring or disk-shaped flanks.

The typical resilient deflectability of brush seals relative to eccentric motions of the rotor is achieved by means of the tilted orientation of the bristles of the brush seal relative to the seal surface of the rotor or relative to the rotor radial directions. The required degree of deflectability or elasticity of the brush seal can be influenced by properly selecting the bristle length and the degree of tilting of the bristles, independently of the selection of the material for the bristles.

Especially in the above described embodiments having the bristles tilted in the circumferential direction, it has been discovered in practice that the brush seal is sensitive to the rotational direction of the rotor. Namely, if the rotor rotates in a reverse direction, then the bristles, which are tilted in a direction against or opposite such a reverse rotor rotation, become jammed against the rotor seal surface and are thus pushed along with the rotor and consequently become bent in a direction opposite the original tilt angle. As a result, the bristles may be permanently plastically deformed, such that gaps result in the brush seal. This leads to a diminishing seal effectiveness of the brush seal.

SUMMARY OF THE INVENTION

In view of the above it is an object of the invention to provide a brush seal having bristles with at least a section of the bristles tilted in the circumferential direction, which on the one hand achieves the advantages of deflectable bristles, and on the other hand retains its functionality independently of the rotation direction of the rotor. The invention further aims to avoid or overcome the disadvantages of the prior art, and to achieve additional advantages, as apparent from the present description.

The above objects have been achieved according to the invention in a brush seal in which the bristle ends are bent or angled relative to the bristle sections that are oriented at a tilt angle, in such a manner that the tilt angle $\alpha_2$ of the bristle ends is smaller than the tilt angle $\alpha_1$ of the tilted bristle sections. More particularly, the inventive brush seal for sealing a circumferential gap between two machine components includes a plurality of bristles arranged in an annular shape on a first one of the machine components, while the free bristle ends of the bristles are oriented toward a seal surface of the second one of the machine components. Each bristle respectively includes a fixed end secured to the first machine component, a free end portion including a free end tip directed toward the seal surface of the second machine component, and a tilted bristle body section that is tilted in the circumferential direction at a tilt angle $\alpha_1$ relative to the rotor radial directions. The bristle end portions are bent or angled in the circumferential direction relative to the tilted bristle body sections in such a manner that the end portions extend at a tilt angle $\alpha_2$ relative to the radial directions. Particularly, the tilt angle $\alpha_2$ of the bristle ends is smaller than the tilt angle $\alpha_1$ of the tilted bristle body sections.

The brush seal embodied according to the invention has the advantage that it maintains an elastic yieldability or deflectability relative to radial movements of the machine components, substantially independently of the rotational direction of the moving machine component. This functional independence from the direction of rotation is achieved by bending or angling the bristle ends relative to the bristle body sections, such that the tilt angle $\alpha_2$ of the bristle ends is reduced in comparison to the tilt angle $\alpha_1$ of the middle body sections of the bristles. In this manner, the bristle ends are perpendicular or nearly perpendicular to a tangent of the seal surface of the second machine component, and thus are substantially unaffected by a change in rotation direction of the seal surface.

The brush seal according to the invention can be used both in typical rotor-stator arrangements as well as in rotor systems in which a seal is required between two concentric rotors. Depending on whether a seal is to be provided on a seal surface extending on an end face perpendicular to the axis of the rotor or extending on a cylindrical or circumferential surface, the bristles of the brush seal can be oriented in a generally axial direction or in a generally radial direction.

Upon deflection of the bristles in an axial direction, and dependent upon the approximately conical surface orientation of the seal surface, the tilt angle $\alpha_2$ of the bristle ends can be selected in such a manner that the bristle ends are oriented perpendicularly or nearly perpendicularly to the seal surface of the second machine component. As a result of this, the bristle ends will no longer be carried along by the seal surface of the rotating second machine component and thereby broken off or plastically deformed (as was the case in the prior art) in the event that the second machine component rotates in a direction contrary to or against the tilt angle $\alpha_1$ of the bristle body sections, i.e. in a reverse direction.

Moreover, with the present inventive embodiment, the bristle ends may deflect or yield elastically upon making contact with the seal surface of the second machine component. In this context it must be considered that the seal surfaces generally become roughened due to contact with the bristles after a certain operating time, whereby the bristle ends would tend to be deflected more easily due to unevenness or roughness of the seal surface. When the rotating machine component rotates in the reverse direction, any depressions or protrusions of the roughened seal surface would have an increased tendency to catch and carry along the bristle tips, which could lead to breaking or pulling out of individual bristles. This disadvantage of the prior art is overcome by the embodiment of the brush seal according to the invention.

By appropriately dimensioning the bristle length and the tilt angle $\alpha_1$, the elastic yielding or deflecting characteristic of the bristles in the radial direction typically provided by brush seals can still be achieved. Preferably, the ratio of the length of the tilted bristle body sections relative to the length of the bristle ends is in the range from about 1 to about 6, whereby the term "about" encompasses production and wear tolerances. Moreover, the length of the tilted body sections is preferably at least 50% of the total length of the bristles. Preferably, the tilt angle $\alpha_2$ of the bristle ends is in the range from 0° to 15°, and more preferably in the range from 0° to 5°, while the tilt angle $\alpha_1$ of the tilted body sections is preferably in the range from 30°to 60°. Furthermore, in addition to the tilt angles $\alpha_1$ and $\alpha_2$ in the circumferential direction, the bristles are preferably tilted at an acute angle $\beta$ in the axial direction relative to a radial annular plane of the brush seal.

According to a further embodiment of the invention, the brush seal further includes two ring or disk-shaped flanks or shanks of a seal housing or of the adjacent component, whereby these two flanks or shanks are typically axially spaced from one another, and the bristles are guided therebetween. The height of the two flanks is selected so that the bristles protrude out from between the two flanks. The two flanks respectively extend toward the second component and form, relative to the second component, a second circumferential gap which is larger than the first circumferential gap that is to be sealed by the bristles, under normal operating conditions. However, under extreme operating conditions, a radial deflection of the second machine component can occur and cause the second circumferential gap to become smaller at least locally at a particular area around the circumference of the brush seal. Moreover, the flanks, which extend to a proper spacing distance away from the second machine component, may protect the bristles from turbulence caused by the pressure medium impinging thereon. The flanks, which particularly extend to a location just short of the bristle ends, also avoid a further undesired effect, namely the circumferential deflection of the tilted bristles when they are bent due to the differential pressure over the protruding edge of the flank.

According to a further embodiment of the invention, the fixed radially outer end portions of the seal bristles are received and fixed in a bristle holder comprising the above mentioned flanks. The fixed end portions preferably extend essentially parallel to the radial directions around the rotor. The bristles may further be provided with a coating that reduces friction of the bristles against the seal surface of the second machine component.

When the brush seal according to the invention is used in a fluid flow machine, the strengths or advantages of the brush seal, namely the seal effectiveness and the resilient yielding relative to radial rotor movements, are best brought into play when the brush seal is concentrically arranged between a radially outer stator and a radially inner rotor such as a shaft. In a brush seal that is rotationally rigidly fixed to the stator, the packing density of the bristles increases radially inwardly toward the seal surface of the rotor, so that the seal effectiveness is greatest in the critical area in the gap relative to the seal surface.

BRIEF DESCRIPTION OF THE DRAWINGS

In order that the invention may be clearly understood, it will now be described, in connection with example embodiments, with reference to the drawings, wherein:

FIG. 2 is a partial sectional view of a rotor-stator arrangement with a brush seal according to the invention;

FIG. 3B is a schematic sectional view similar to that of FIG. 3A, but showing a different embodiment of a seal bristle according to the invention;

DETAILED DESCRIPTION OF PREFERRED EXAMPLE EMBODIMENTS AND OF THE BEST MODE OF THE INVENTION

Figure 1:
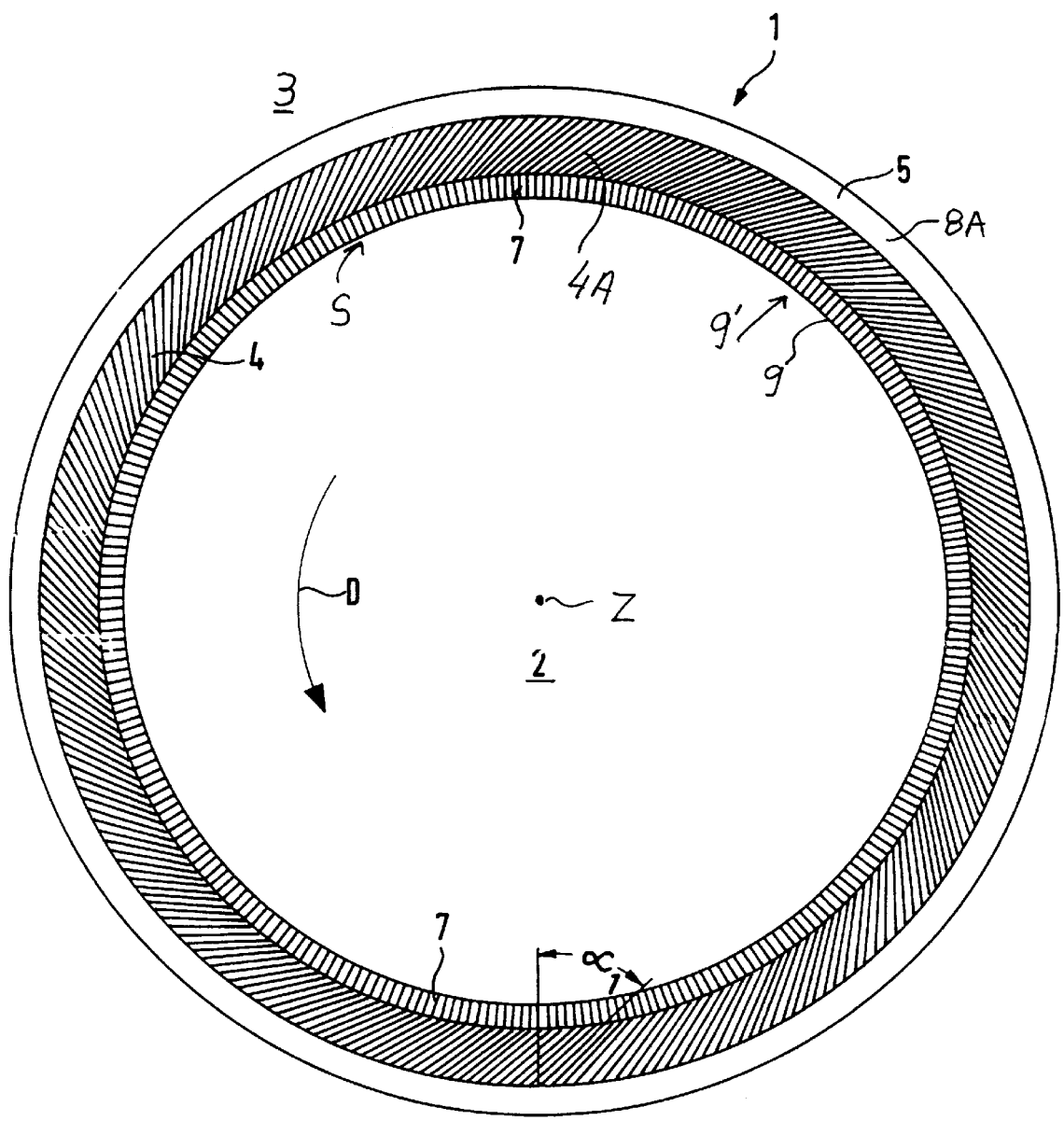
FIG. 1 is a schematic axial view of a brush seal according to the invention, having bristles that are directed generally on a radial plane, but tilted in the circumferential direction.

The brush seal 1 shown in FIG. 1 is for sealing a circumferential gap S between two relatively rotatable machine components 2 and 3. In the most common application, the second machine component is a rotor 2 that is rotatably supported in and relative to the first machine component which is a stator 3. Depending on the particular requirements of seal effectiveness and the resilient yielding character of the brush seal 1, a particular packing density of the bristles 4 of the brush seal 1 is prescribed, so that the brush seal 1 comprises a corresponding plurality of bristles 4 which are distributed over the annular circumference of the brush seal as uniformly as possible. At the radially outer or stator-side ends, the bristles 4 are securely held in a bristle holder 5, which in turn is rotationally rigidly, i.e. non-rotatably, secured to the stator 3. The bristles 4 extend radially inwardly to protrude from a circumferential slit 6 formed radially inwardly in the bristle holder 5, in a direction toward the center Z of the brush seal 1. Disregarding the packing thickness of the bristles 4, the bristles lie in the radial annular plane E of the brush seal 1, which here corresponds to the plane of the drawing.

In order that the bristles 4 are not damaged in the event of a radial relative motion of the rotor with respect to the stator, the bristles 4 are embodied in an elastically flexible manner. A radial deflection of the bristles 4 is made possible in that a central body section 4A of each bristle is tilted or oriented in the circumferential direction at a tilt angle $\alpha_1$ relative to a radial line. However, a bristle end 7 of each bristle is bent or angled relative to the bristle body sections 4A, and extends toward the seal surface 9 of the rotor 2 as will be discussed below. The bristle ends 7 may be received in a circumferential groove 9' formed in the outer circumferential surface of the rotor 2, whereby the floor of the groove 9' forms the seal surface 9. The view of FIG. 1 is, for example, taken on a section plane passing through the circumferential groove 9'. The detailed configuration of the bristles 4 as well as their orientation in the radial annular plane E are clearly shown in FIGS. 2 and 3.

FIG. 2 shows a sector portion of the brush seal 1 arranged between a rotor 2 and a stator 3 substantially as in FIG. 1.

However, in comparison to FIG. 1, FIG. 2 shows the arrangement from the back, so to speak, whereby the bristles 4 on the back-side of the brush seal 1 are covered and supported by an annular disk-shaped flank 8B of the bristle holder 5, whereby the flank 8B extends toward the rotor 2 up to a second circumferential gap $S_2$. Namely, the second circumferential gap $S_2$ is shown in FIG. 2 as the spacing or gap between the radially inner edge of the flank 8B and the rotor 2. The first annular or circumferential gap $S_1$ is the smaller spacing gap between the radially inner ends or tips of the bristles 4 and the seal surface 9 of the rotor 2. As can be seen in the broken-open portion in FIG. 2, each bristle 4 comprises a middle body section 4A that is tilted at the tilt angle $\alpha_1$, a radially outer fixed end portion 4B that is secured between the shanks or flanks 8A and 8B of the bristle holder 5, and the free bristle end portions 7 with free bristle tips that extend toward and form a seal against the seal surface 9 of the rotor 2. The specific embodiments of the bristles 4 will be discussed below.

Figure 3A:
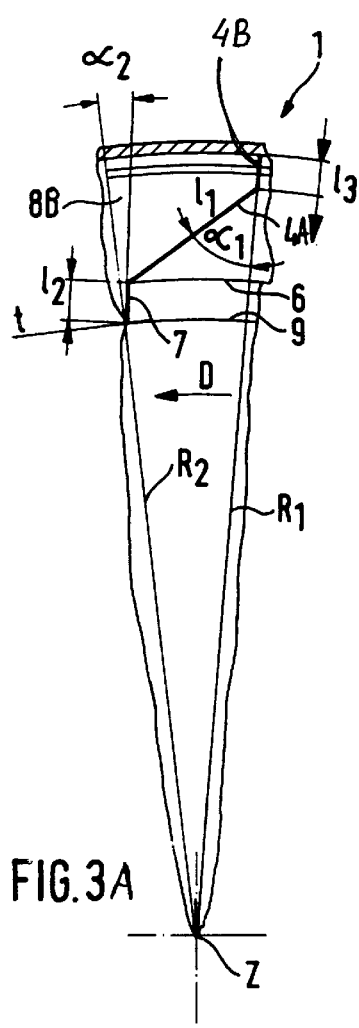
FIG. 3A is a schematic sectional view showing a single bristle of a brush seal according to the embodiment of FIG. 2, for illustrating angular and dimensional relationships according to the invention.

In order to illustrate the angular relationships and dimensional relationships pertaining to the bristles 4, FIG. 3A shows one embodiment of a single bristle 4 in a schematic sectional view taken on a radially extending section plane. The bristle 4 includes a radially outer fixed end portion 4B of length $l_3$ that is oriented in a radially extending direction and that is secured in the bristle holder 5, which is shown in section. The specific manner of securing the bristles 4 in the bristle holder 5 will be described below with reference to FIGS. 4A and 4B. Adjoining the fixed portion 4B, the bristle 4 includes a middle body section 4A having a length $l_1$ and extending at a tilt angle $\alpha_1=45°$ relative to a radial reference line $R_1$, which extends from the axis or center Z of the brush seal to the intersection or junction of the radially outer fixed portion 4B and the tilted middle section 4A of the bristle 4.

At the radially inner end, adjoining the middle section 4A of each bristle 4, there is a radially inner free bristle end 7 that is angled or bent relative to the middle body section 4A, such that the bristle end 7 is directed at a rather small angle relative to a radial line, or preferably as perpendicularly as possible to a tangent t extending along the seal surface 9 of the rotor 2 at the point of intersection with the free tip of the bristle end 7. In the embodiment shown in FIG. 3A, the bristle end 7 having the length $l_2$ is tilted at a slight tilt angle $\alpha_2=5°$ relative to a radial reference line $R_2$, which extends from the center Z through the free end or tip of the bristle end 7. In the ideal case, the center Z of the brush seal 1 coincides with the center of the axis of the rotor. In the event that the center of the seal deviates from the center of the rotor or vice versa due to operational or installation conditions, then the radial offset between the two centers is compensated by the elastic yielding deflectability of the bristles 4.

As can be seen in FIG. 3A, the three portions or sections of the bristle 4 are each substantially straight elements, which adjoin one another at distinct intersections or bend points. The substantially straight form of the bristle sections or portions is nominally straight, but includes elastic curvature when the bristles are installed under a pre-tension stress or under operating stress.

Regarding the length relationships, it should be noted that the length $l_1$ of the middle body section 4A of the bristle 4 amounts to about 65%, and at least 50%, of the total bristle length $l_G=l_1+l_2+l_3$. The bristles are tilted in a circumferential direction such that the tilt angles $\alpha_1$ and $\alpha_2$ are oriented so as to follow after the rotation direction D of the rotor 2. In other words, for the embodiment shown in the drawings, the bristles are tilted from their fixed ends to their free ends in the direction of rotation D of the rotor 2, such that the middle body section 4B as well as the free end section 7 of the bristles 4 are respectively tilted in the rotation direction D away from the respective radial reference lines $R_1$ and $R_2$. In arrangements of machine components that are both rotatable, the rotation direction D is to be understood as the resultant or relative component of the individual rotation vectors combined or superimposed on one another. Also in this case, the middle body section 4A of the bristle 4 would be tilted in a direction following the resultant rotation defined by the relative rotation vector.

FIG. 3B shows an alternative embodiment relative to FIG. 3A, in which the bristles 4 are uniformly tilted at the tilt angle $\alpha_1$ relative to a radial reference line $R_1$ all the way up to the end of the bristle that is fixed in the bristle holder 5. In other words, both the middle body section 4A and the radially outer end portion 4B of the bristle 4 are uniformly tilted at the angle $\alpha_1$. Another way of understanding this embodiment is that the fixed end is provided directly on the tilted body section 4A, without an intervening fixed end portion 4B. In this case, the radial reference line $R_1$ extends from the brush seal center Z through the radially outer end or tip of the bristle 4. Another difference relative to the embodiment of FIG. 3A, is that in FIG. 3B the bristle end 7 is bent slightly more sharply relative to the middle body section 4A, so that the angle $\alpha_2=0°$ or about $0°$, i.e. the bristle end 7 extends perpendicularly to the tangent t of the seal surface 9 or within a very small +/- angular tolerance range around $0°$ allowing for production and installation tolerances and operational wear.

Figure 4A:
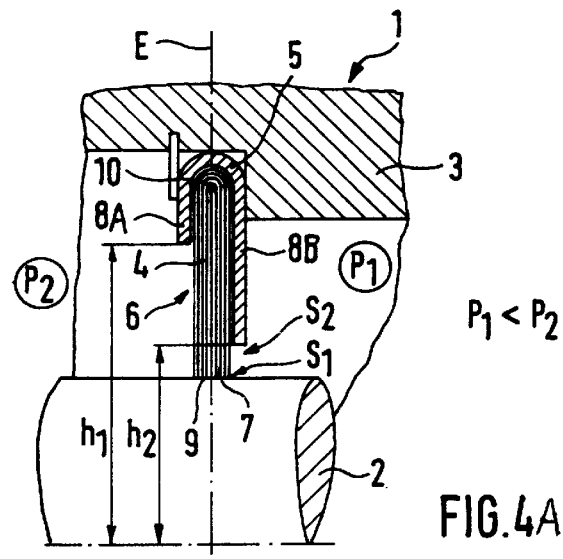
FIG. 4A is a partial lengthwise section of the rotor-stator arrangement of FIG. 2 in the area of the brush seal.
Figure 4B:
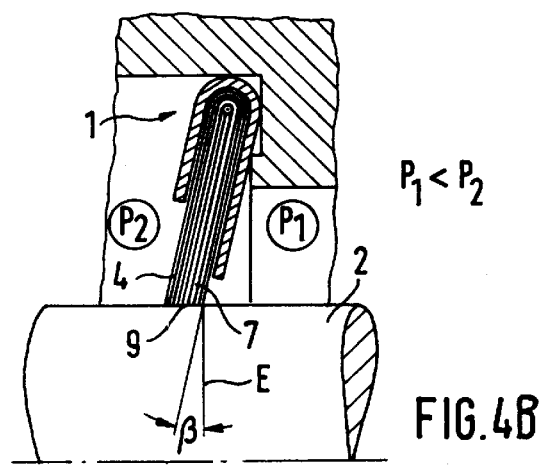
FIG. 4B is a view similar to that of FIG. 4A, but showing an alternative embodiment in which the seal bristles are additionally tilted in an axial direction relative to the radial annular plane.

FIGS. 4A and 4B show how the bristles 4 are fastened or fixed in the bristle holder 5. In this context, the bristles 4 are each bent or wrapped in a U-shaped loop around a concentric core ring 10, and this arrangement is then received in the bristle holder 5, which has a U-shaped cross-section comprising two axially spaced shanks or flanks 8A and 8B, which respectively have different radial lengths so that the radially inner edges thereof are positioned at different radial heights $h_1$ and $h_2$. The bristies 4 extend in and protrude radially from the axial slot or space 6 between the two flanks 8A and 8B, so as to cover and seal the second circumferential gap $S_2$ defined between the seal surface 9 and the radially inner edge of the flank 8B at the radial height $h_2$. The first circumferential gap $S_1$ is the gap between the radially inner free ends of the bristles 4 and the seal surface 9.

In the particular embodiment of FIG. 4A, the bristles 4, as well as the flanks 8A and 8B of the bristle holder 5, extend parallel to the annular radial plane E, which extends through the core ring 10. By viewing FIG. 3A and FIG. 4A together, it can be seen that the radially outer fixed bristle ends 4B are covered or received between the two flanks 8A or 8B of the bristle holder 5, while the middle body sections 4A of the bristles 4 extend out of the circumferential slot or slit 6 between the two flanks 8A and 8B and are exposed on the side of the shorter flank 8A while being covered and supported on the side of the longer flank 8B. The free bristle ends 7 then protrude freely from the circumferential slit or slot 6 to seal the circumferential gap S2 as described above.

Note that a larger circumferential gap is formed between the seal surface 9 and the radially inner edge of the shorter flank 8A of the bristle holder 5, as compared to the gap $S_2$ defined by the longer flank 8B. As a result of this arrangement, the middle body section 4A of each bristle 4 that is tilted at an angle is completely covered by a flank 8B on the side subjected to a lower pressure $P_1$, such that the bristles are supported from this side against the higher pressure $P_2$ on the opposite side. On the other hand, the shorter flank 8A only covers or supports a portion of the middle body section 4A of the bristles 4, since less support is needed toward the high pressure side $P_2$, and since this arrangement allows additional elastic deflection and yielding of the bristles 4.

FIG. 4B shows an alternative embodiment in which the bristle holder 5 and the bristles 4 are formed as a frusto-conical ring that is tilted, at an acute angle β which is equal to 15° in this example, in an axial direction relative to the radial plane E extending through the core ring 10. Thus, the brush seal 1 has a slightly angled conical form, i.e. the bristles 4 extend along a conical surface. This tilting of the bristles 4 toward the high pressure side $P_2$ achieves the result that the free bristle ends 7 will be lightly pressed against the seal surface 9 of the rotor 2 due to the pressure difference between the high pressure side $P_2$ and the low pressure side $P_1$, whereby the leakage may be reduced.

Figure 5:
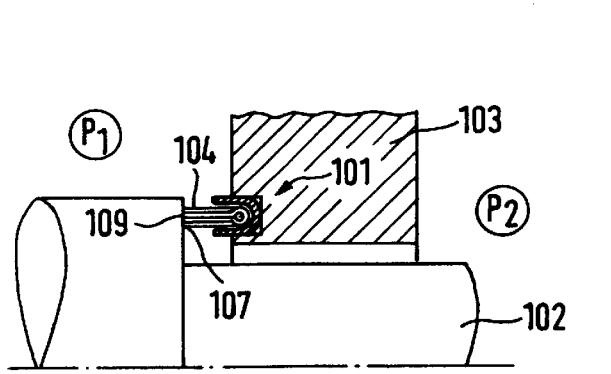
FIG. 5 is a schematic view similar to that of FIG. 4A, but showing an alternative embodiment in which the bristles extend substantially axially to seal against a radially extending seal surface.

FIG. 5 schematically shows another application embodiment, wherein a brush seal 101 is mounted on a stator 103 to seal a gap between the stator 103 and a rotor 102. The brush seal 101 is once again embodied with a ring-shape or annular shape and comprises a plurality of bristles 104 that extend predominantly in an axial direction, or more specifically along a cylindrical circumferential surface, such that free ends 107 of the bristles 104 form a seal against a seal surface 109 provided on a radially extending end face of the rotor 102. The bristles 104 are each made up of a middle body section, a fixed end portion, and a free bristle end as described above. The middle body section of each bristle is tilted in the circumferential direction, i.e. away from a line perfectly parallel with the rotation axis. The bristle ends 107 are bent or angled relative to the middle body sections, such that the bristle ends 107 are oriented substantially perpendicularly onto the seal surface 109. Due to the tilted or angled arrangement of the middle body sections of the bristles in this embodiment, the bristles can yield or elastically deflect in the axial direction so as to compensate any axial relative motions between the rotor 103 and the stator 102. Radial relative motions are easily compensated by the bristle ends 107 simply sliding to a different radial position on the seal surface 109.

Figure 6:
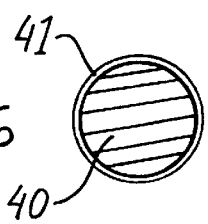
FIG. 6 is a schematic cross-section of a bristle showing a low friction coating provided on a bristle core.

As shown schematically in FIG. 6, each bristle 4 or 104 may comprise a bristle core 40 and a low friction coating 41 provided around the core, at least at the free end portion of the bristle. The coating 41 serves to reduce the friction of the bristle against the seal surface 9 or 109 of the rotor.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A brush seal for sealing a circumferential gap between first and second rotary machine components of which one is rotatable relative to another, said brush seal comprising a plurality of seal bristles that are arranged in an annular shape and that each respectively include a fixed end, a tilted section, and a free end portion terminating in a free end tip, wherein said fixed end of each said bristle is adapted to be secured to the first component, said free end portion of each said bristle is adapted to be directed with said free end tip toward a seal surface of the second component, said tilted section of each said bristle is tilted at a first tilt angle ($\alpha_1$) in a circumferential direction, said free end portion of each said bristle extends at an angle relative to said tilted section such that said free end portion is tilted at a second tilt angle ($\alpha_2$) in said circumferential direction, and said second tilt angle ($\alpha_2$) is smaller than said first tilt angle ($\alpha_1$).

2. The brush seal of claim 1, wherein said tilted section of each said bristle is tilted from said fixed end to said free end portion in a direction following a rotation direction of said rotatable one of said first and second components.

3. The brush seal of claim 1, wherein said first tilt angle ($\alpha_1$) is defined as an angle between said tilted section and a first radial reference line extending from an axial center of said brush seal through a point on said tilted section adjoining said fixed end, and said second tilt angle ($\alpha_2$) is defined as an angle between said free end portion and a second radial reference line extending from said axial center through said free end tip.

4. The brush seal of claim 1, wherein said tilted section of each said bristle is substantially straight, said free end portion of each said bristle is substantially straight, and said tilted section and said free end portion adjoin each other at a distinct intersection bend point.

5. The brush seal of claim 1, wherein said first tilt angle ($\alpha_1$) is in a range from 30° to 60°.

6. The brush seal of claim 5, wherein said second tilt angle ($\alpha_2$) is in a range from 0° to 15°.

7. The brush seal of claim 6, wherein said second tilt angle ($\alpha_2$) is in a range from 0° to 5°.

8. The brush seal of claim 6, wherein said bristles are arranged to extend parallel to a frusto-conical imaginary surface that is angled in an axial direction at an acute angle (β) greater than 0° relative to a radial plane that is perpendicular to a central axis of said brush seal.

9. The brush seal of claim 1, wherein said second tilt angle ($\alpha_2$) is in a range from 0° to 15°.

10. The brush seal of claim 1, wherein said second tilt angle ($\alpha_2$) is in a range from 0° to 5°.

11. The brush seal of claim 1, wherein said second tilt angle ($\alpha_2$) is about 0°.

12. The brush seal of claim 1, wherein said bristles are arranged to extend parallel to a radial plane that is perpendicular to a central axis of said brush seal.

13. The brush seal of claim 1, wherein said bristles are arranged to extend parallel to a frusto-conical imaginary surface that is angled in an axial direction at an acute angle ($\beta$) greater than 0° relative to a radial plane that is perpendicular to a central axis of said brush seal.

14. The brush seal of claim 13, wherein said acute angle ($\beta$) is 15°.

15. The brush seal of claim 1, wherein said bristles are arranged to extend parallel to a cylindrical imaginary surface that is coaxial with a center axis of said brush seal.

16. The brush seal of claim 1, wherein said tilted section of each said bristle has a first length ($l_1$), said free end portion of each said bristle has a second length ($l_2$), and a ratio ($l_1/l_2$) of said first length ($l_1$) relative to said second length ($l_2$) is in a range from about 1 to about 6.

17. The brush seal of claim 1, wherein each said bristle has a total bristle length ($l_G$) said tilted section of each said bristle has a first length ($l_1$), and said first length ($l_1$) is at least 50% of said total bristle length ($l_G$).

18. The brush seal of claim 1, further comprising two ring-shaped support flanks spaced apart from each other with a gap therebetween, wherein said bristles are arranged and guided in said gap between said flanks with said tilted section of each said bristle arranged within a range of extension spanned by at least one of said flanks, and said free end portion of each said bristle protrudes beyond a respective free edge of each said flank.

19. The brush seal of claim 18, wherein said two flanks each have a different length extending to said respective free edge, and said tilted section of each said bristle is covered on one side by a longer one of said flanks and is at least partially not covered on an opposite side by a shorter one of said flanks.

20. The brush seal of claim 18, wherein said two flanks each have a same length extending to said respective free edge.

21. The brush seal of claim 18, wherein said flanks comprise annular disks that each extend parallel to a radial plane.

22. The brush seal of claim 18, wherein said flanks comprise cylindrical shells that each extend coaxially with a center axis of said brush seal.

23. The brush seal of claim 18, wherein said flanks comprise frustoconical disks angled by an acute angle ($\beta$) from a radial plane.

24. The brush seal of claim 1, further comprising a bristle holder a housing, wherein each said bristle further includes a fixed end portion at and incorporating said fixed end, wherein said fixed end portion of each said bristle is securely held in said bristle holder housing and extends in a respective substantially radial direction.

25. The brush seal of claim 1, further comprising a bristle holder housing, wherein said tilted section extends uniformly with said first tilt angle entirely to said fixed end, and wherein a portion of said tilted section and said fixed end are securely held in said bristle holder housing.

26. The brush seal of claim 1, wherein said bristles each respectively comprise a bristle core and a low-friction coating arranged on said core to reduce friction of said bristles relative to the seal surface of the second component.

27. In a fluid flow machine including a stator, a rotor rotatably arranged relative to the stator, and a brush seal arranged to seal a circumferential gap between the rotor and the stator, an improvement wherein said brush seal comprises a plurality of seal bristles that are arranged in an annular shape and that each respectively include a fixed end, a tilted section, and a free end portion terminating in a free end tip, wherein said fixed end of each said bristle is secured to the stator, said free end portion of each said bristle is directed with said free end tip toward a seal surface of the rotor, said tilted section of each said bristle is tilted at a first tilt angle ($\alpha_1$) in a circumferential direction, said free end portion of each said bristle extends at an angle relative to said tilted section such that said free end portion is tilted at a second tilt angle ($\alpha_2$) in said circumferential direction, and said second tilt angle ($\alpha_2$) is smaller than said first tilt angle ($\alpha_1$).

28. A method of using the fluid flow machine including said improvement in said brush seal according to claim 27, comprising rotating said rotor in a first direction and then rotating said rotor in a second direction opposite said first direction without damaging said brush seal.

* * * * *